US008964240B2

(12) United States Patent
Imai

(10) Patent No.: US 8,964,240 B2
(45) Date of Patent: Feb. 24, 2015

(54) METHOD FOR PRODUCING IMAGE FORMING APPARATUS, METHOD FOR ADJUSTING QUANTITY OF LIGHT EMITTED FROM PRINTHEAD, AND METHOD FOR PRODUCING PROCESS CARTRIDGE

(71) Applicant: Shigeaki Imai, Kanagawa (JP)

(72) Inventor: Shigeaki Imai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/852,109

(22) Filed: Mar. 28, 2013

(65) Prior Publication Data

US 2013/0321875 A1 Dec. 5, 2013

(30) Foreign Application Priority Data

May 31, 2012 (JP) ................................. 2012-124145

(51) Int. Cl.
*H04N 1/40* (2006.01)
*G03G 15/04* (2006.01)

(52) U.S. Cl.
CPC .... *G03G 15/04045* (2013.01); *G03G 15/04054* (2013.01)
USPC ............................................ 358/1.4; 358/1.7

(58) Field of Classification Search
CPC ................ G03G 15/5058; G03G 2215/00037; G03G 15/326; G03G 2215/00059; G03G 2215/00054; G03G 2215/0404; H04N 1/40037; H04N 1/4005; H04N 2201/0471; H04N 2201/04744
USPC ............. 358/1.7, 1.4, 1.9, 2.1, 300, 296, 468; 359/204.1–204.5, 210.1; 399/3–4, 51, 399/72, 55–56
See application file for complete search history.

(56) References Cited

U.S. PATENT DOCUMENTS

| | | | | |
|---|---|---|---|---|
| 6,292,206 | B1 | 9/2001 | Takehara et al. | |
| 6,889,015 | B2 * | 5/2005 | Shimura | 399/49 |
| 7,315,704 | B2 * | 1/2008 | Shin et al. | 399/57 |
| 2002/0051052 | A1 | 5/2002 | Masuda et al. | |
| 2004/0165240 | A1 | 8/2004 | Suzuki et al. | |

(Continued)

FOREIGN PATENT DOCUMENTS

| | | |
|---|---|---|
| JP | 11-342650 | 12/1999 |
| JP | 2001-270146 | 10/2001 |

(Continued)

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

The method for producing an image forming apparatus includes emitting light beams from a printhead; optionally irradiating a photoreceptor with the light beams to form a latent image; optionally forming a visible image on a recording medium corresponding the latent image; obtaining plural pieces of information concerning a property of the light beams or lightness of the visible image at different positions in a direction; calculating variation width of N pieces of information corresponding to an attention area having a predetermined length in the direction; determining the number of pieces of information used for subjecting each of the N pieces of information to moving averaging, based on the variation width; when the number is two or more, subjecting each of the N pieces of information to moving averaging; and correcting quantities of light beams corresponding to the N pieces of information based on the average values.

12 Claims, 12 Drawing Sheets

(56) References Cited

U.S. PATENT DOCUMENTS

| | | | |
|---|---|---|---|
| 2004/0240000 | A1 | 12/2004 | Miyatake et al. |
| 2005/0094234 | A1 | 5/2005 | Miyatake et al. |
| 2005/0190420 | A1 | 9/2005 | Imai et al. |
| 2006/0158711 | A1 | 7/2006 | Imai et al. |
| 2007/0058255 | A1 | 3/2007 | Imai et al. |
| 2007/0236557 | A1 | 10/2007 | Imai et al. |
| 2008/0019255 | A1 | 1/2008 | Imai et al. |
| 2008/0068678 | A1 | 3/2008 | Suzuki et al. |
| 2008/0170283 | A1 | 7/2008 | Imai |
| 2008/0192323 | A1 | 8/2008 | Nakamura et al. |
| 2008/0259426 | A1 | 10/2008 | Imai |
| 2009/0058979 | A1 | 3/2009 | Saisho et al. |
| 2009/0073529 | A1 | 3/2009 | Imai |
| 2009/0073531 | A1 | 3/2009 | Imai |
| 2009/0074437 | A1 | 3/2009 | Tanabe et al. |
| 2009/0225385 | A1 | 9/2009 | Imai |
| 2009/0231654 | A1 | 9/2009 | Imai |
| 2010/0310284 | A1 | 12/2010 | Funato et al. |
| 2011/0102536 | A1 | 5/2011 | Imai |
| 2012/0027450 | A1 | 2/2012 | Imai |
| 2012/0056968 | A1 | 3/2012 | Imai et al. |
| 2012/0182367 | A1 | 7/2012 | Masuda et al. |

FOREIGN PATENT DOCUMENTS

| | | |
|---|---|---|
| JP | 2002-127492 | 5/2002 |
| JP | 2005-035197 | 2/2005 |
| JP | 2005-271574 | 10/2005 |
| JP | 2007-258973 | 10/2007 |

* cited by examiner

METHOD FOR PRODUCING IMAGE FORMING APPARATUS, METHOD FOR ADJUSTING QUANTITY OF LIGHT EMITTED FROM PRINTHEAD, AND METHOD FOR PRODUCING PROCESS CARTRIDGE

CROSS-REFERENCE TO RELATED APPLICATIONS

This patent application is based on and claims priority pursuant to 35 U.S.C. §119 to Japanese Patent Application No. 2012-124145 filed on May 31, 2012 in the Japan Patent Office, the entire disclosure of which is hereby incorporated by reference herein.

FIELD OF THE INVENTION

The present invention relates to a method for producing an image forming apparatus, a method for adjusting the quantity of light emitted from a printhead, and a method for producing a process cartridge. More particularly, the present invention relates to a method for producing an image forming apparatus including a printhead including multiple light emitting portions and an image bearing member; a method for adjusting the quantity of light emitted from a printhead; and a method for producing a process cartridge including a printhead and an image bearing member.

BACKGROUND OF THE INVENTION

Methods for correcting the quantity of light emitted from a printhead including multiple light emitting portions have been proposed.

However, since the level of quality requirements for images (output images) formed by a printhead becomes higher and higher recently, it is difficult for such light quantity correction methods to form images fulfilling the recent image quality requirements.

BRIEF SUMMARY OF THE INVENTION

As an aspect of the present invention, a method for producing an image forming apparatus is provided. The image forming apparatus includes at least a printhead having multiple light emitting portions, which are arranged at different positions in a uniaxial direction to emit multiple light beams separated from each other in the uniaxial direction; and an image bearing member located on a light path of the multiple light beams. The method includes:

(1) emitting multiple light beams separated from each other in the uniaxial direction from the multiple light emitting portions;

(2) optionally irradiating the image bearing member with the multiple light beams to form an electrostatic latent image on a surface of the image bearing member;

(3) optionally forming a visible image on a recording medium based on the electrostatic latent image, wherein the visible image extends in the uniaxial direction;

(4) obtaining plural pieces of information concerning a property of the multiple light beams, or lightness of the visible image at different positions of the visible image in the uniaxial direction;

(5) calculating a reference value based on either two or more pieces of information among the plural pieces of information at two or more different positions in a predetermined range, which has a predetermined length in the uniaxial direction, or a combination of the two or more pieces of information and information on the two or more different positions;

(6) determining a number of pieces of information, which is used for subjecting each of the two or more pieces of information to moving averaging, based on the reference value;

(7) when the number of pieces of information is two or more, subjecting each of the two or more pieces of information to moving averaging using the number; and (8) correcting quantities of light beams emitted from two or more light emitting portions of the multiple light emitting portions, which correspond to the two or more different positions in the uniaxial direction, based on the average values obtained by the moving averaging.

As another aspect of the present invention, a method for adjusting quantities of multiple light beams emitted from multiple light emitting portions of a printhead, which are arranged at different positions in a uniaxial direction, is provided. The method includes:

emitting multiple light beams separated from each other in the uniaxial direction from the multiple light emitting portions;

optionally irradiating an image bearing member with the multiple light beams to form an electrostatic latent image on a surface of the image bearing member;

optionally forming a visible image on a recording medium based on the electrostatic latent image, wherein the visible image extends in the uniaxial direction;

obtaining plural pieces of information concerning a property of the multiple light beams, or lightness of the visible image at different positions of the visible image in the uniaxial direction;

calculating a reference value based on either two or more pieces of information among the plural pieces of information at two or more different positions in a predetermined range, which has a predetermined length in the uniaxial direction, or a combination of the two or more pieces of information and information on the two or more different positions;

determining a number of pieces of information, which is used for subjecting each of the two or more pieces of information to moving averaging, based on the reference value;

when the number of pieces of information is two or more, subjecting each of the two or more pieces of information to moving averaging using the number; and correcting quantities of light beams emitted from two or more light emitting portions of the multiple light emitting portions, which correspond to the two or more different positions in the uniaxial direction, based on the average values obtained by the moving averaging.

As yet another aspect of the present invention, a method for producing a process cartridge is provided. The process cartridge is detachably attachable to an image forming apparatus as a single unit and includes at least a printhead and an image bearing member. The method includes the above-mentioned steps (1) to (8).

The aforementioned and other aspects, features and advantages will become apparent upon consideration of the following description of the preferred embodiments taken in conjunction with the accompanying drawings.

BRIEF DESCRIPTION OF THE SEVERAL VIEWS OF THE DRAWINGS

FIG. 7(*b*) is a graph illustrating a curve of lightness obtained by subjecting the lightness illustrated in FIG. 7(*a*) to advanced moving averaging;

DETAILED DESCRIPTION OF THE INVENTION

The present inventors recognized that since the level of quality requirements for images formed by a printhead becomes higher and higher recently, there is a need for a method for adjusting the quantity of light emitted from a printhead, by which images fulfilling the recent image quality requirements can be formed.

An embodiment of the present invention will be described by reference to FIGS. 1-10B.

Figure 1:
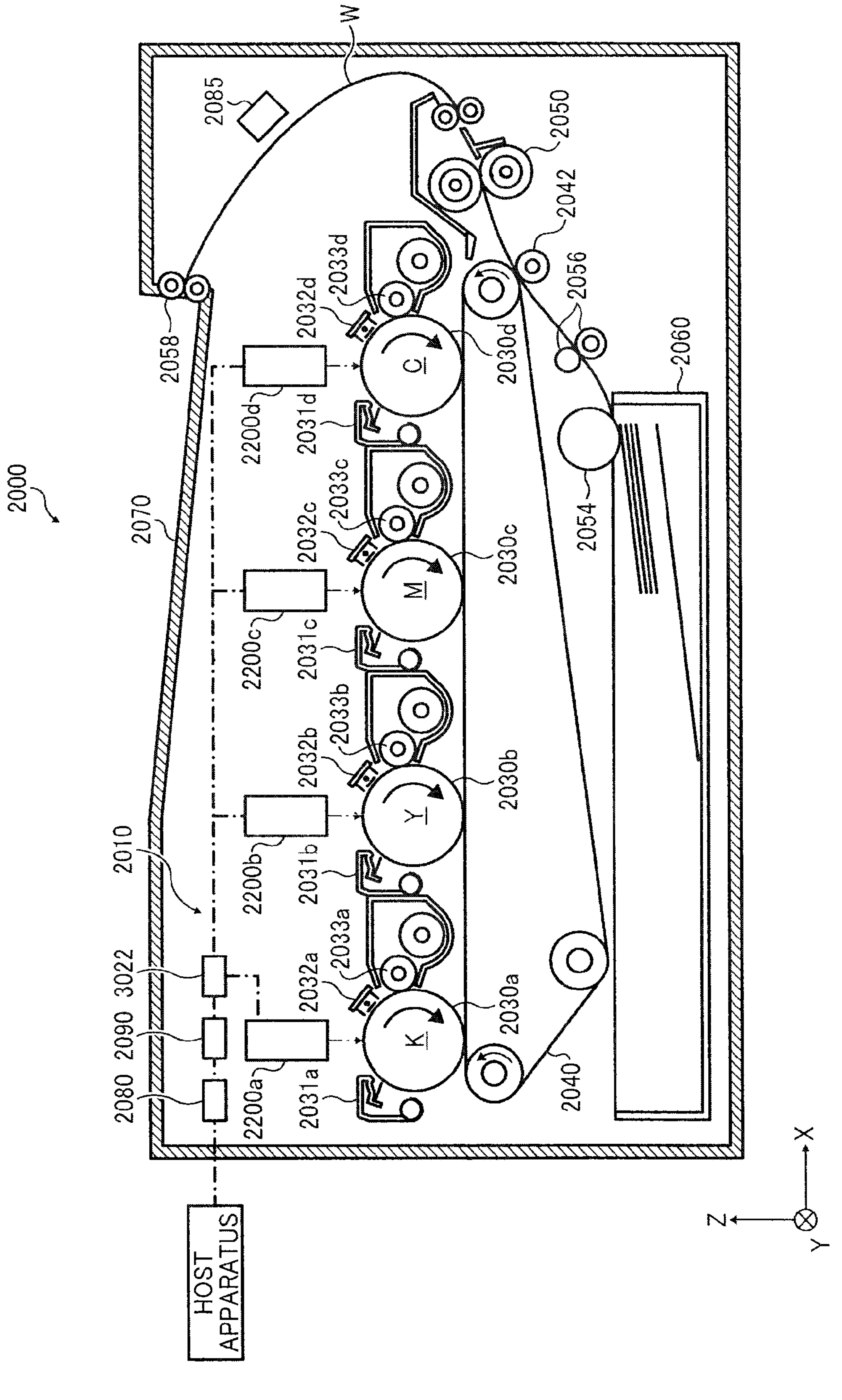
FIG. 1 is a schematic view of a color printer for use in describing a method for producing an image forming apparatus according to an embodiment.

FIG. 1 illustrates a color printer 2000 for use in describing the embodiment. The color printer 2000 is a tandem type multicolor printer, which produces a full color images by overlaying four color images (i.e., black, yellow, magenta and cyan color images). The color printer 2000 includes a light source 2010 including four printheads 2200 (2200*a*, 2200*b*, 2200*c* and 2200*d*); four photoreceptor drums 2030 (2030*a*, 2030*b*, 2030*c* and 2030*d*) serving as image bearing members; four cleaners 2031 (2031*a*, 2031*b*, 2031*c* and 2031*d*); four chargers 2032 (2032*a*, 2032*b*, 2032*c* and 2032*d*); four developing devices including respective developing rollers 2033 (2033*a*, 2033*b*, 2033*c* and 2033*d*); a transfer belt 2040; a transfer roller 2042; a fixing device 2050; a feeding roller 2054; a pair of registration rollers 2056; a discharging roller 2058; a recording medium tray 2060; a copy tray 2070; a communication controller 2080; a scanner 2085; and a printer controller 2090 to control the above-mentioned devices.

In the color printer 2000 illustrated in FIG. 1, the longitudinal direction of the photoreceptor drum 2030, which is perpendicular to the rotation direction thereof, is parallel to a Y-axis direction, and the four photoreceptor drums 2200 are arranged in a direction parallel to an X-axis direction.

The communication controller 2080 controls two-way communication between a host apparatus (such as personal computers) and the printer via a network or the like.

The printer controller 2090 includes a CPU (central processing unit); a ROM (read only memory) in which program described with a code, which can be read by the CPU, and data used for executing the program are stored; a RAM (random access memory) which is used as a working memory; and an AD (analog-digital) converter circuit which converts analog data to digital data. The printer controller 2090 sends image information, which is sent from the host apparatus, to the light source 2010.

In the color printer 2000, the photoreceptor drum 2030*a*, the printhead 2200*a*, the charger 2032*a*, the developing device including the developing roller 2033*a*, and the cleaner 2031*a* constitute a black image forming station (hereinafter sometimes referred to as a K station), which forms a black toner image.

The photoreceptor drum 2030*b*, the printhead 2200*b*, the charger 2032*b*, the developing device including the developing roller 2033*b*, and the cleaner 2031*b* constitute a yellow image forming station (hereinafter sometimes referred to as a Y station), which forms a yellow toner image.

The photoreceptor drum 2030*c*, the printhead 2200*c*, the charger 2032*c*, the developing device including the developing roller 2033*c*, and the cleaner 2031*c* constitute a magenta image forming station (hereinafter sometimes referred to as a M station), which forms a magenta toner image.

The photoreceptor drum 2030*d*, the printhead 2200*d*, the charger 2032*d*, the developing device including the developing roller 2033*d*, and the cleaner 2031*d* constitute a cyan image forming station (hereinafter sometimes referred to as a C station), which forms a cyan toner image.

Each photoreceptor 2030 has a photosensitive layer on the surface thereof, and is rotated by a rotating mechanism (not shown) in a direction indicated by an arrow in FIG. 1. Hereinafter, the suffixes (a-d) of the reference numerals of the above-mentioned devices are not described when the devices are not distinguished from each other.

The chargers 2032 uniformly charge the surfaces of the corresponding photoreceptor drums 2030.

The light source 2010 (printheads 2200) irradiates the charged surfaces of the photoreceptor drums 2030 with light beams modulated according to multicolor image information (black image information, yellow image information, magenta image information and cyan image information) sent from the printer controller 2090 to form electrostatic latent images corresponding to black, yellow, magenta and cyan images on the respective photoreceptor drums 2030. The electrostatic latent images are fed toward the developing rollers 2033 as the photoreceptor drums 2030 are rotated. The light source 2010 will be described later in detail.

Color toners included in the corresponding developing devices (which include the developing rollers 2033 therein) are supplied to the corresponding developing rollers 2033 as the developing rollers rotate, to form thin color toner layers on the developing rollers. When the color toners on the developing rollers 2033 are contacted with the surfaces of the corresponding photoreceptor drums 2030, the color toners are transferred to the irradiated portions of the photoreceptor drums, thereby forming visible images (K, Y, M and C color toner images) on the surfaces of the photoreceptor drums. Namely, the developing rollers 2033 attach the color toners to the electrostatic latent images formed on the corresponding photoreceptor drums 2030, thereby forming color toner images. The color toner images on the surfaces of the photoreceptor drums 2030 are fed toward the transfer belt 2040 as the photoreceptor drums rotate.

The thus formed C, M, Y and K color toner images are sequentially transferred onto the transfer belt 2040 at predetermined times so that the color toner images are overlaid on the transfer belt, thereby forming a combined multicolor toner image on the transfer belt.

Sheets of a recording medium (hereinafter referred to as recording sheets) such as papers are stored in the recording medium tray 2060. The feeding roller 2054 arranged in the vicinity of the front end of the recording medium tray 2060 picks up the recording sheets one by one and feeds the recording sheet to the pair of registration rollers 2056. The pair of registration rollers 2056 timely feeds the recording sheet toward the nip between the transfer belt 2040 and the transfer roller 2042 so that the combined multicolor toner image on the transfer belt is transferred onto a proper position of the recording sheet at the nip. The recording sheet bearing the combined multicolor toner image thereon is fed to the fixing device 2050.

The fixing device 2050 applies heat and pressure to the recording sheet to fix the multicolor toner image, resulting in formation of a full color image on the recording sheet. The recording sheet W bearing the full color image thereon is fed to the copy tray 2070 via the discharging roller 2058 so as to be stacked on the copy tray.

The cleaners 2031 remove residual toners remaining on the corresponding photoreceptor drums 2030 after the color toner images on the photoreceptor drums are transferred. The cleaned surfaces of the photoreceptor drums 2030 are returned to the positions, at which the photoreceptor drums face the chargers 2032 so that the photoreceptor drums are ready for the next image forming operation.

In the color printer 2000, the developing device including the developing roller 2033, the transfer belt 2040, and the fixing device 2050 serves as main devices of a visible image forming device, which forms a visible image on the corresponding photoreceptor drum 2030.

The scanner 2085 is arranged, for example, at a location in the vicinity of the sheet passage of from the fixing device 2050 to the copy tray 2070 as illustrated in FIG. 1. For example, the scanner 2085 includes an irradiator, which includes a light emitting device and which irradiates a solid image 100 (illustrated in FIG. 6) on the recording sheet W while receiving the reflection light to obtain image information on the solid image 100. The scanner 2085 scans the entire surface of the recording sheet W in the width direction of the sheet (i.e., Y-axis direction), for example, at a resolution of 600 dpi (dot per inch).

Next, the light source 2010 will be described.

The light source 2010 includes, for example, a controller 3022, etc., in addition to the four printheads 2200*a*, 2200*b*, 2200*c* and 2200*d*. These devices are attached to an optical housing (not shown).

For example, the four printheads 2200 are arranged on the +Z side of the corresponding photoreceptor drums 2030 as illustrated in FIG. 1. In addition, for example, the four printheads 2200 are arranged in the X direction as illustrated in FIG. 1.

Figure 2:
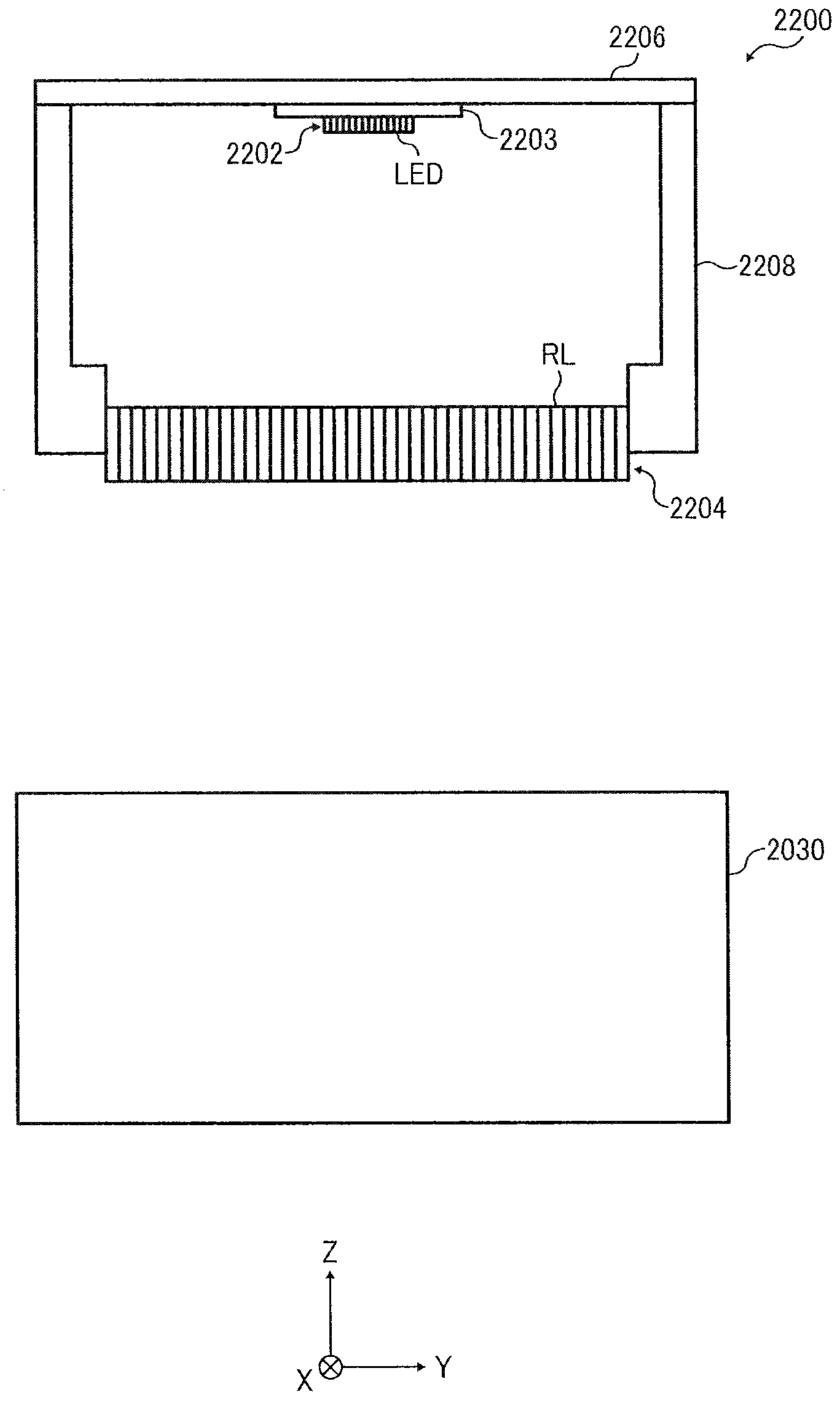
FIG. 2 is a schematic elevation view of a printhead and an image bearing member of the color printer illustrated in FIG. 1.
Figure 3:
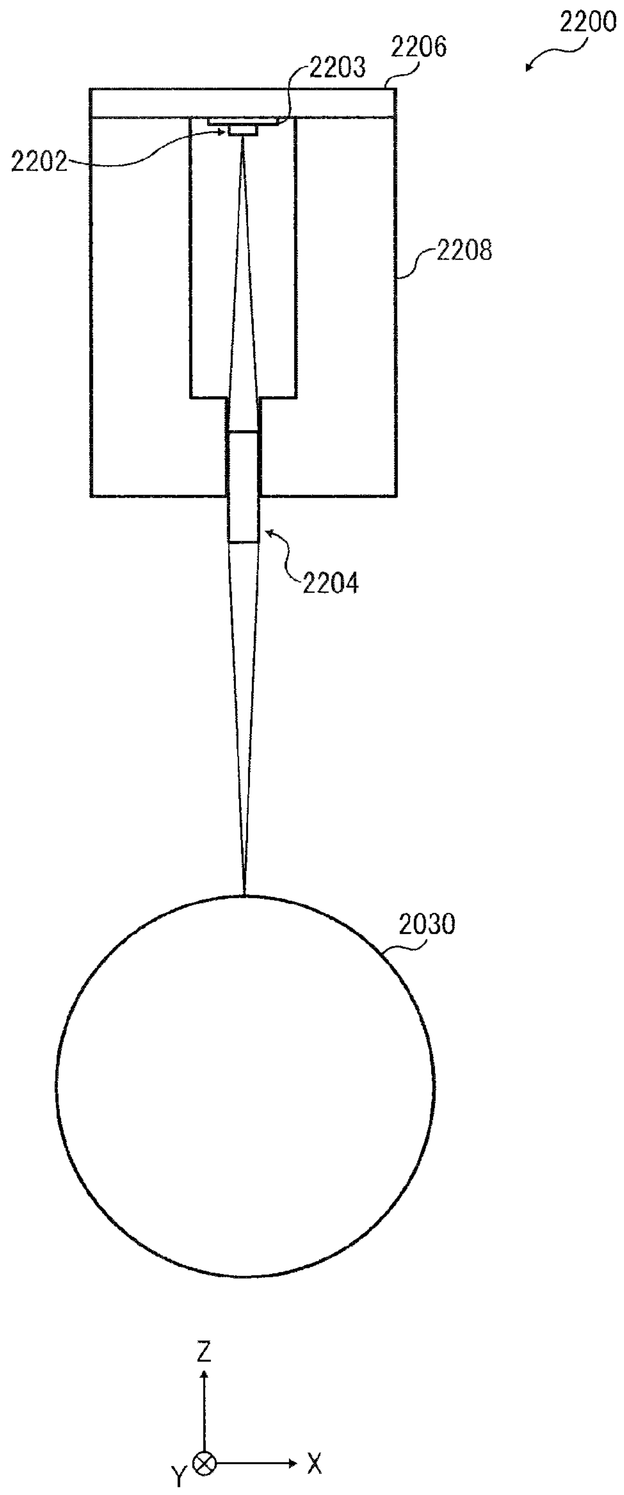
FIG. 3 is a schematic side view of the printhead and the image bearing member illustrated in FIG. 2.

An example of the printhead 2200 is illustrated in FIGS. 2 and 3. The printhead 2200 includes a LED array 2202 including multiple LEDs (light emitting diodes) which serve as light emitting portions and which are arranged one-dimensionally; a substrate 2203; a rod lens array 2204 including multiple rod lenses RL, which are arranged one-dimensionally and each of which is a gradient index lens; a holding member 2206, which is a plate extending parallel to the X-Y plane; and a package member 2208 including a cylindrical member extending in the Z-axis direction.

The LED array 2202 of this color printer has a structure such that the plural LEDs are arranged on a lower (−Z side) surface of the substrate 2203 so as to extend in the Y-axis direction. The LEDs emit light beams in a −Z direction. The substrate 2203 is set on a lower (−Z side) surface of the holding member 2206 so as to be parallel to the X-Y plane. The holding member 2206 is set on an upper (+Z side) surface of the package member 2208 so as to be parallel to the X-Y plane.

Each of the LEDs of the LED array 2202 emits a light beam to form one pixel.

The rod lens array 2204 is inserted into the package member 2208 so that the plural rod lenses RL are lined in the Y-axis direction. Namely, the rod lens array 2204 is arranged on a −Z side from the LED array 2202. The plural rod lenses RL correspond to the plural LEDs, and are located on the light paths of the light beams emitted from the corresponding LEDs. Therefore, plural light beams are emitted from the rod lens array 2204 while separated from each other in the Y-axis direction.

The light beam emitted from one of the LEDs of the printhead 2200 is focused on the surface of the photoreceptor drum 2030 by the corresponding rod lens RL, thereby forming a light spot on the surface of the photoreceptor drum. Namely, conjugate images of the LEDs of the LED array 2204 are formed on surface of the corresponding photoreceptor drum 2030.

Figure 4:
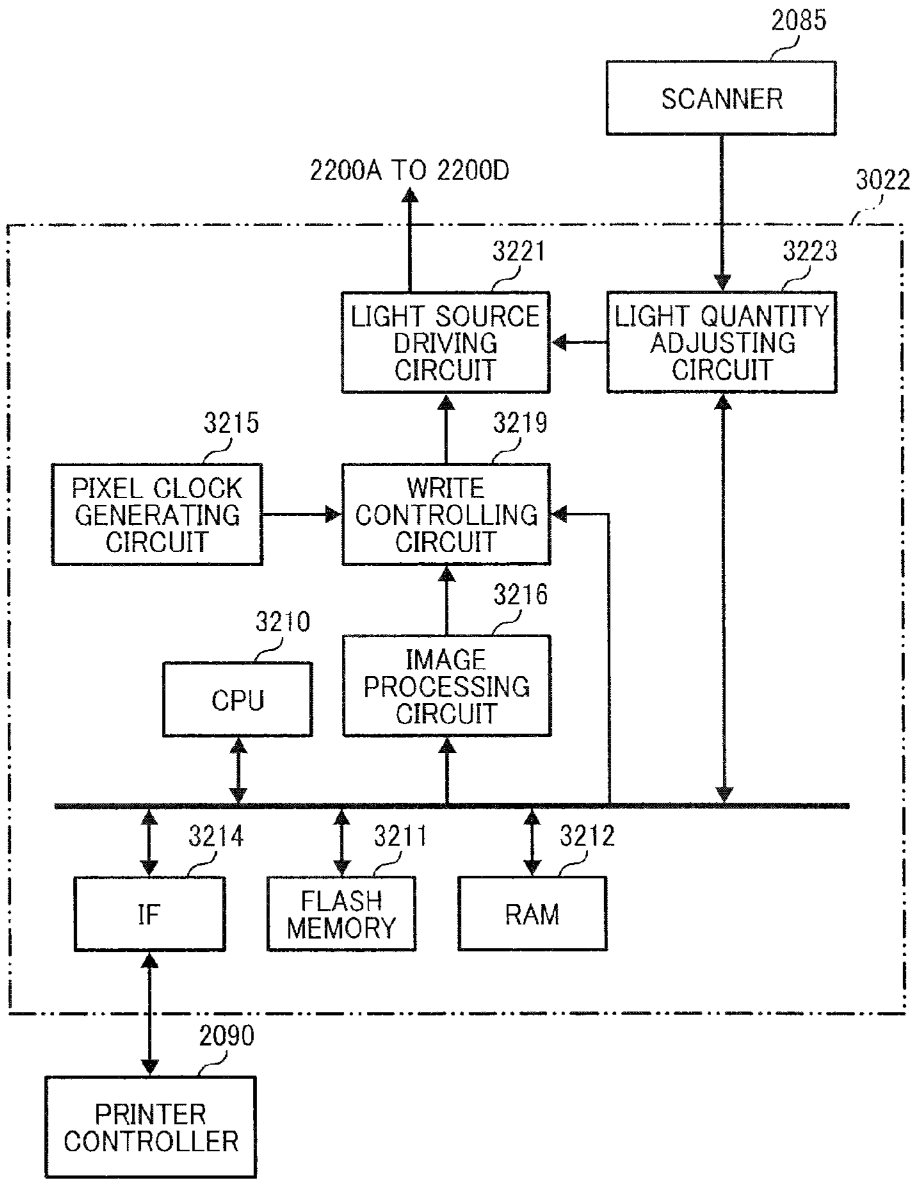
FIG. 4 is a block diagram for use in describing a controlling operation of the color printer illustrated in FIG. 1.

An example of the controller 3022 is illustrated in FIG. 4. The controller 3022 includes a CPU (central processing unit) 3210, a flash memory 3211, a RAM 3212, an IF (interface) 3214, a pixel clock generating circuit 3215, an image processing circuit 3216, a write controlling circuit 3219, a light quantity adjusting circuit 3223, and a light source driving circuit 3221. In FIG. 4, arrows represent flows of major signals and information, and do not represent all the connections between blocks.

The pixel clock generating circuit 3215 generates a pixel clock signal. The pixel clock signal can be phase-modulated at a resolution of ⅛ clock.

The image processing circuit 3216 performs a half-tone process, etc., on the image, data which are rasterized by the CPU 3210 for each color, and then generates dot data for each LED of each printhead.

The write controlling circuit 3219 allows each image forming station to start image writing at a predetermined time. At the start of writing, the write controlling circuit 3219 superimposes the dot data of each LED on the pixel clock signal sent from the pixel clock generation circuit 3215, and generates independent modulation data for each LED. In addition, the write controlling circuit 3219 performs APC (Auto Power Control) at a predetermined time.

The light quantity adjusting circuit 3223 generates light quantity correction data according to image information of the solid image 100 read by the scanner 2085 to correct the quantity of light emitted from each printhead 2200, and then sends the light quantity correction data to the light source driving circuit 3221.

The light source driving circuit 3221 generates a driving signal according to the modulation data sent from the write controlling circuit 3219 while correcting the driving signal using the light quantity correction data sent from the light quantity adjusting circuit 3223, and outputs the corrected driving signal to each printhead 2200.

The IF 3214 is a communication interface to control the two-way communication between the printer controller 2090 and the controller 3022.

The flash memory 3211 stores programs and data used for executing a variety of programs, which are described using codes readable by the CPU 3210.

The RAM 3212 is a working memory.

The CPU 3210 operates according to the programs stored in the flash memory 3211, and controls the entire light source 2010.

In conventional image forming apparatuses in which an image is formed on a recording medium via a photoreceptor drum using a printhead emitting multiple light beams, an uneven density problem in that the photoreceptor drum is unevenly irradiated by the multiple light beams when the light beams have uneven properties, thereby forming an image with uneven image density (e.g., vertical stripe image) on the recording medium is often caused. Specific examples of the uneven properties of the light beams emitted by the printhead include variation of the quantity of the light beams at the focusing points thereof (i.e., light spots) on the photoreceptor drum, and variation of the size of the light beams at the focusing points thereof (i.e., light spots) on the photoreceptor drum.

In this embodiment, the quantity of light emitted from the printhead 2200 is adjusted to prevent occurrence of the uneven density problem.

Hereinafter, an example of the method for adjusting the quantity of light emitted from the printhead 2200 will be described by reference to the flowchart illustrated in FIG. 5. In this regard, the flowchart corresponds to the processing algorithm executed the controller 3022. Since the light quantity adjusting operation is performed on each printhead 2200, description will be performed by reference to one of the printheads 2200.

Initially, by using one of the printheads 2200, the solid image 100 (illustrated in FIG. 6) is formed on the recording medium W via the corresponding photoreceptor drum 2030.

In this regard, the solid image 100 is formed by the series of image forming processes mentioned above except that only one printhead is used. Specifically, the printhead 2200 irradiates the surface of the corresponding photoreceptor drum 2030 with light modulated according to image information of the solid image 100 to form an electrostatic latent image of the solid image on the surface of the photoreceptor drum. The developing roller 2033 develops the electrostatic latent image with a developer including a color toner, to form a solid color toner image on the photoreceptor drum. The thus formed solid color toner image is transferred onto the recording medium W via the transfer belt 2040. The fixing device 2050 fixes the solid color toner image on the recording medium W. In this regard, the image information of the solid image 100 is preliminarily stored in the flash memory 3211.

In this printer, the resolution of the printhead is set to 600 dpi (dot per inch), but the resolution is not limited thereto. Therefore the solid image 100 is formed on the recording medium W at a resolution of 600 dpi. The feeding direction of the recording medium W is sometimes referred to as a sheet ejection direction, and the sheet ejection direction corresponds to the rotation direction of the photoreceptor drum 2030.

The solid image 100 is a half-tone image (for example, with a lightness of from 1 to 99%), which is formed on substantially the entire surface of the recording medium W in the width direction of the recording medium by using (lighting) all the LEDs of the printhead 2200. The multiple pixels constituting the solid image 100 are formed by supplying the same current (reference current) to the corresponding LEDs.

Namely, the solid image 100 is constituted of multiple pixels, which are arranged in a virtual rectangular area, which extends two-dimensionally in the sheet ejection direction and the Y-axis direction and whose longer side is parallel to the sheet ejection direction. Namely, a row of multiple pixels extending in the sheet ejection direction is formed side by side in the Y-axis direction, wherein the number of the pixel rows in the Y-axis direction is the same as the number of the LEDs of the LED array 2202, i.e., the pixel rows correspond to the LEDs.

After the solid image 100 on the recording medium W is fixed by the fixing device 2050, the recording medium is fed in the sheet ejection direction while facing the scanner 2085.

The scanner 2085 scans the solid image 100 and sends the image information of the solid image to the light quantity adjusting circuit 3223. The light quantity adjusting circuit 3223 obtains information of lightness of each pixel from the image information. Thus, the lightness information of each pixel of the solid image 100 is obtained.

Figure 5:
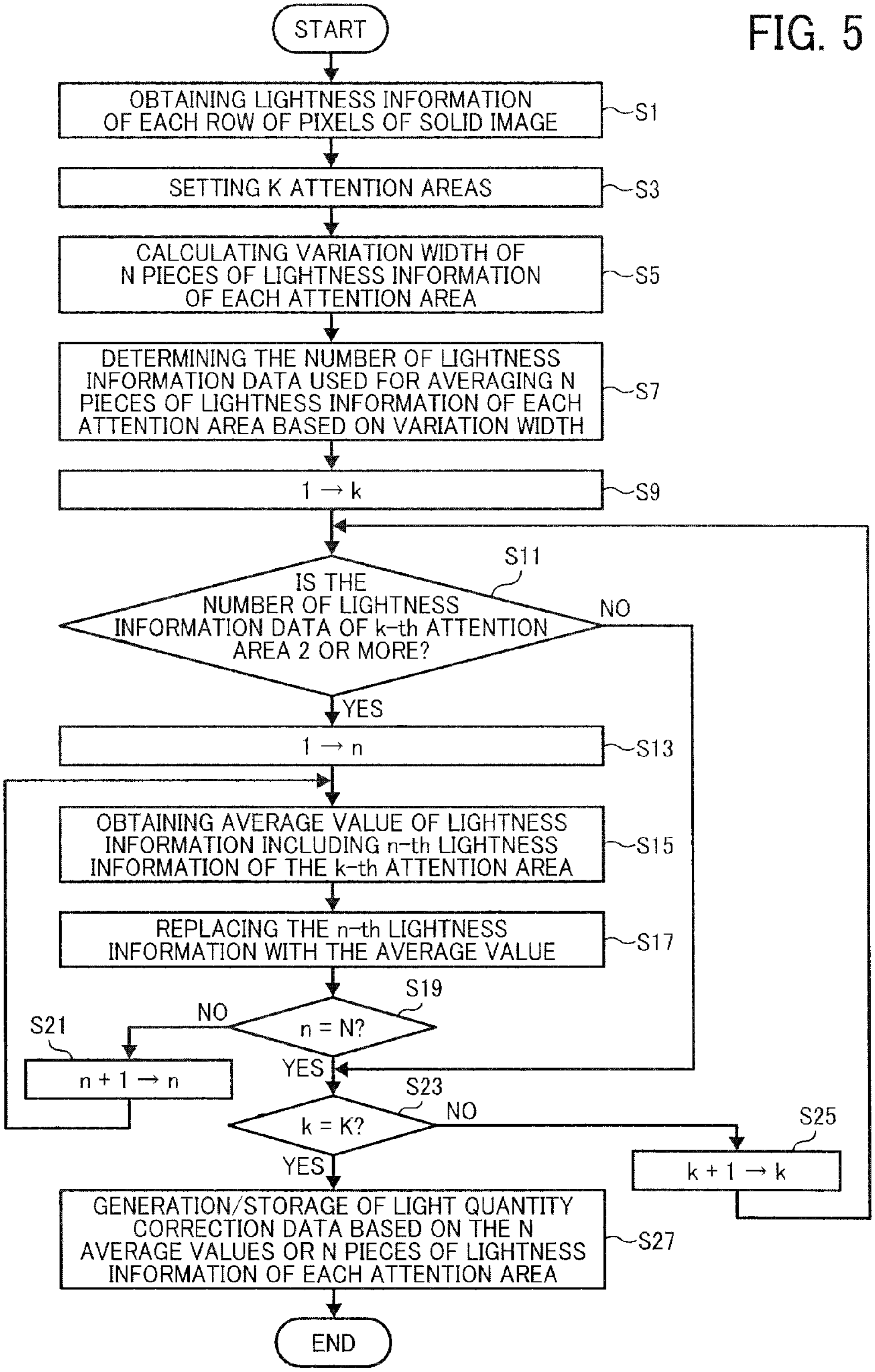
FIG. 5 is a flowchart illustrating an operation of adjusting the quantity of light emitted from the printhead.
Figure 6:
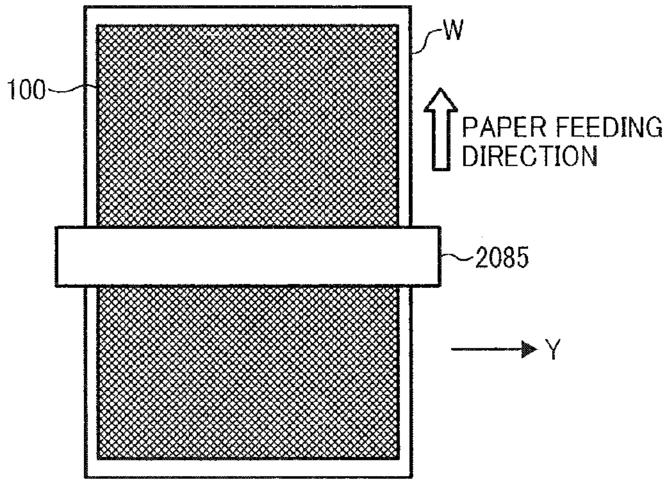
FIG. 6 is a schematic view for use in describing a solid image to be formed on a recording medium.

In step S1 in the flowchart illustrated in FIG. 5, the lightness information of each pixel row of the solid image is obtained. Specifically, the light quantity adjusting circuit 3223 obtains the average of plural pieces of lightness information of each pixel row of the solid image 100. In this regard, the average is used as the lightness information of the pixel row. In this regard, the plural pieces of lightness information of the solid image 100 correspond to the multiple LEDs of the LED array 2202.

Figure 7:
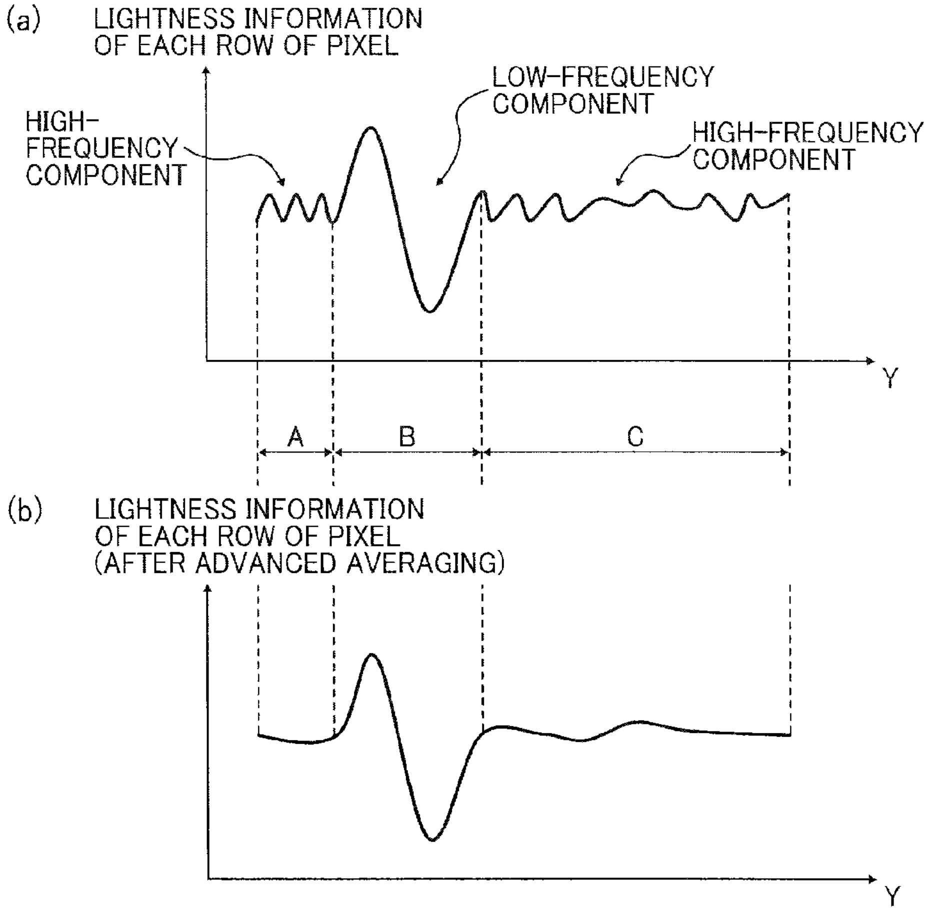
FIG. 7(*a*) is a graph illustrating relation between the position of row of pixels of the solid image in a uniaxial direction (Y direction) and the lightness of the pixels.

FIG. 7(*a*) is a graph illustrating the lightness information on each pixel row of the solid image 100, i.e., change of lightness of the solid image in the Y-axis direction.

In next step S3, K pieces of attention areas having a predetermined width D in the Y-axis direction, each of which has N pieces of lightness information among the plural pieces of information on lightness of the solid image 100, are set. In this regard, N is an integer of not less than 2, and K is a positive integer.

Namely, for example, each attention area is an area, which has a width D and which is located at a position (Y-position) in the Y-axis direction and has N (e.g., 2d+1, wherein d is a positive integer) pieces of lightness information including n-th lightness information concerning a pixel row of the solid image 100. In this example, N is set to 21 (d=10), but is not limited thereto.

The width D of each attention area is preferably from 0.1 mm to 2 mm, and more preferably from 0.5 mm to 1.5 mm. In this example, the width D is set to 0.89 mm. In this case, when the distance between the pixel row at the leftmost (−Y) side (in FIG. 6) of the solid image 100 and the rightmost (+Y) side of the solid image is 200 mm, the number (K) of the attention areas may be set to 200 or more. All the pixels of the solid image 100 in the Y-axis direction are preferably included in any one of the attention areas, i.e., the attention areas are continuously formed in the Y-axis direction without any space therebetween.

In step S5, a reference value is calculated for each attention area using the N pieces of lightness information of the attention area, or a combination of the N pieces of lightness information and the Y-positions of the pixels rows corresponding to the N pieces of lightness information. In this example, the reference value is variation (Δ) (i.e., difference between the maximum value and the minimum value) of the N pieces of lightness information in each attention area. Thus, in step S5, the variation (Δ) of the N pieces of lightness information in each attention area is calculated.

In step S7, the number of lightness information data used for obtaining the moving average of the N pieces of lightness information in each attention area is determined based on the variation (Δ) of the N pieces of lightness information.

In this regard, an uneven density image (e.g., vertical stripe image) is formed due to deficiency of the printhead 2200. However, in an area such as areas A and C in FIG. 7(*a*), in which the variation (Δ) of the N pieces of lightness information is small and the lightness varies at a high frequency, a vertical stripe image is hardly observed because typical image forming apparatuses cannot resolve such an image density variation, or the human eyes cannot resolve such an image density variation even when the high frequency component is not corrected. In contrast, in an area such as area B in FIG. 7(*a*), in which the variation (Δ) is relatively large and the lightness varies at a relatively low frequency, a vertical stripe image tends to be visually observed.

In addition, when the solid image 100 is scanned by the scanner 2085 to measure the lightness of the image, a certain level of measurement error is caused. In this case, if the light quantity correction is made using light quantity correction data obtained based on the lightness information including the measurement error, a stripe image may be formed due to the measurement error.

Therefore, it is preferable that the high frequency component of the curve of lightness of the solid image 100 in the Y-axis direction is removed while leaving the low frequency component of the lightness curve by averaging plural lightness information data and producing light quantity correction data, which are used for correcting the quantity of light emitted from the printhead 2200, based on the averaged lightness information. In this regard, it is considered that such measurement error is typically included in the high frequency component of the lightness curve.

Namely, it is preferable that the plural pieces of lightness information of the solid image 100 illustrated in FIG. 7(*a*) is averaged in the Y-axis direction to obtain such an averaged lightness information curve as illustrated in FIG. 7(*b*), and the light quantity correction data are produced based on the averaged lightness information.

Specifically, it is preferable that as the variation (Δ) of the plural pieces of lightness information in an attention area becomes larger, the number of lightness information data used for obtaining the moving average of the plural pieces of lightness information is set to a smaller number. In other words, as the variation (Δ) of the plural pieces of lightness information in an attention area becomes smaller, the number of lightness information data used for obtaining the moving average of the plural pieces of lightness information is set to a larger number. Such a decision is made for each attention area. Namely, the advanced moving average of the plural pieces of lightness information is obtained for each attention area.

Before describing the advanced moving average, the simple moving average will be described.

Figure 8A:
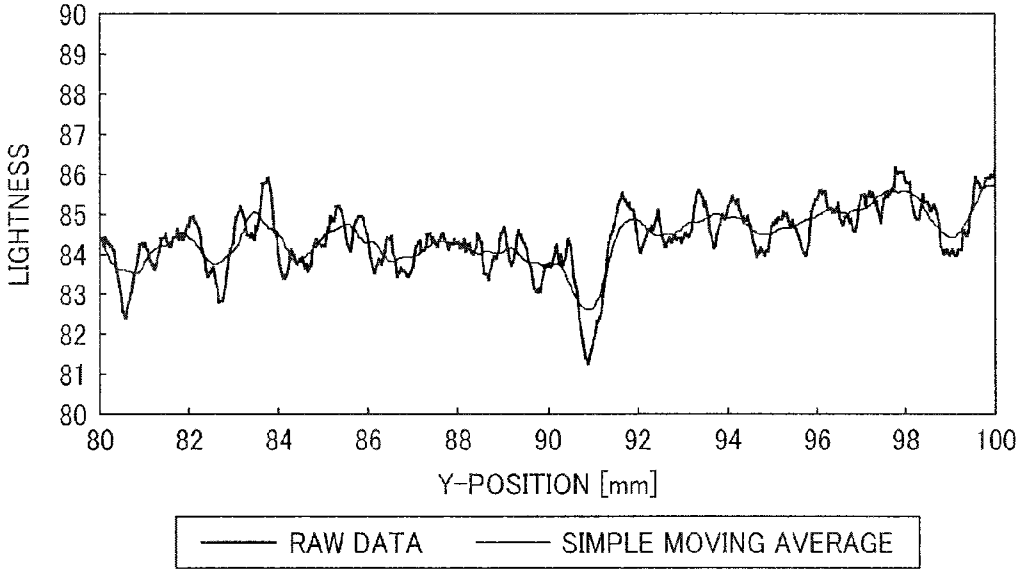
FIG. 8A is a graph illustrating a raw data curve of lightness of the pixels in a range of from 80 mm to 100 mm in the Y direction, and a simple moving average curve of lightness.
Figure 9A:
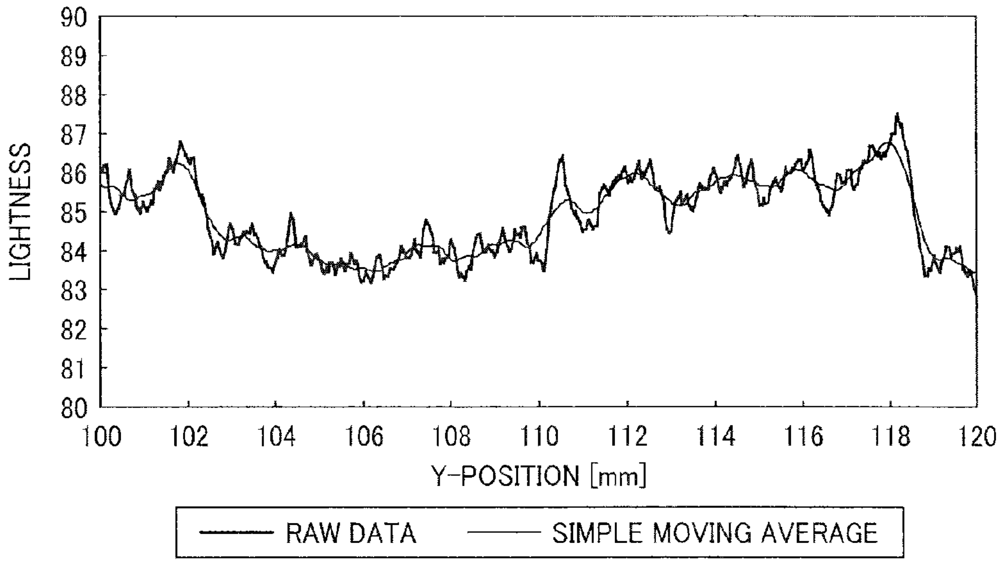
FIG. 9A is a graph illustrating a raw data curve of lightness of the pixels in a range of from 100 mm to 120 mm in the Y direction, and a simple moving average curve of lightness.
Figure 10A:
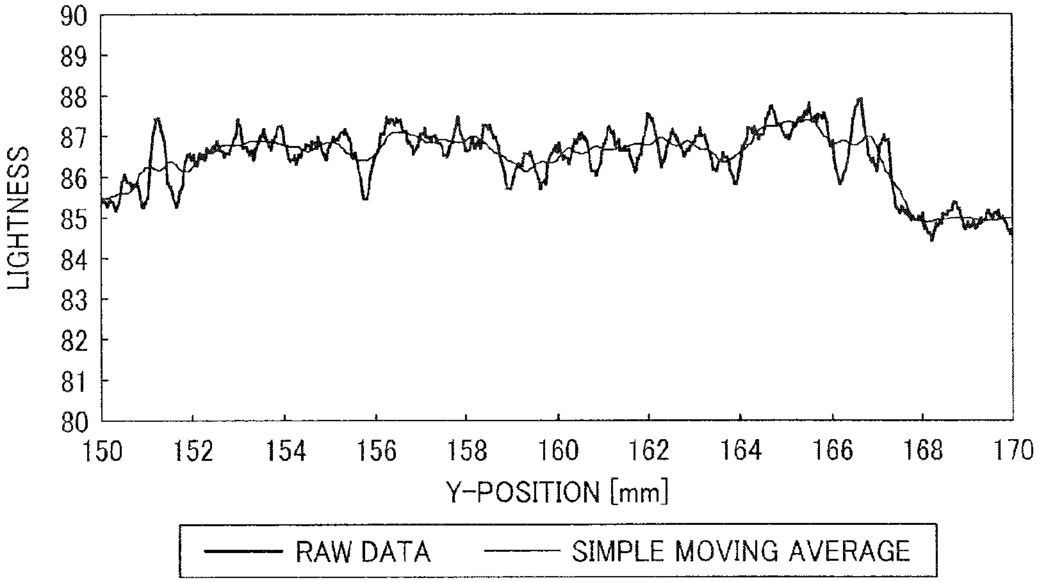
FIG. 10A is a graph illustrating a raw data curve of lightness of the pixels in a range of from 150 mm to 170 mm in the Y direction, and a simple moving average curve of lightness.

In FIGS. 8A, 9A and 10A, actual measurement values of lightness are illustrated by a broad line and the values obtained by subjecting the actual measurement values to simple moving averaging are illustrated by a narrow line. In the graphs illustrated in FIGS. 8A, 9A and 10A, actual measurement values of lightness of the solid image 100 obtained by the scanner 2085 are plotted on the vertical axis, and the Y-positions of the pixel rows are plotted on the horizontal axis.

The moving average is defined by the following equation (1).

$$L_o(x_m) = \left[\sum_{p=m-d}^{m+d} L_i(x_p)\right] \Big/ (2d+1) \tag{1}$$

In equation (1) above, m represents the number of pixel row, $x_m$ represents the Y position of the pixel row with the number m, $L_i(x_p)$ represents the measurement value of lightness when the Y position is $x_p$, $L_o(x_m)$ represents the lightness at $x_m$ after the simple moving averaging, and 2d+1 represents the number of lightness information data used for obtaining the simple moving average.

In the case illustrated in FIGS. 8A, 9A and 10A, d is set to 10. In this case, the average of lightness of the pixel row with the number m is the average of 21 measurement values of from a pixel row with the number of (m−10) to a pixel row with the number of (m+10).

Figure 8B:
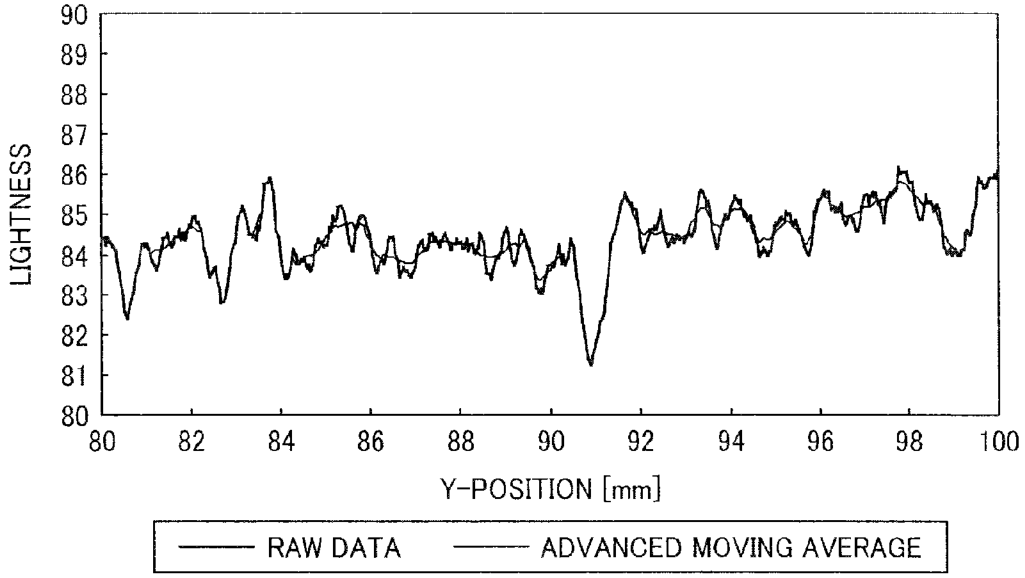
FIG. 8B is a graph illustrating the raw data curve of lightness and an advanced moving average curve of the lightness in the range of from 80 mm to 100 mm in the Y direction.
Figure 9B:
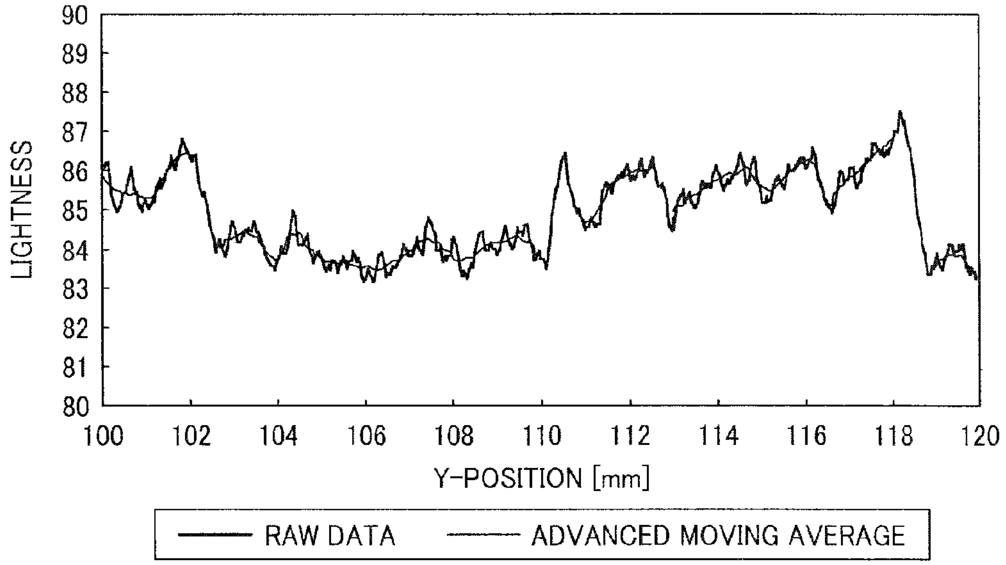
FIG. 9B is a graph illustrating the raw data curve of lightness and an advanced moving average curve of the lightness in the range of from 100 mm to 120 mm in the Y direction.
Figure 10B:
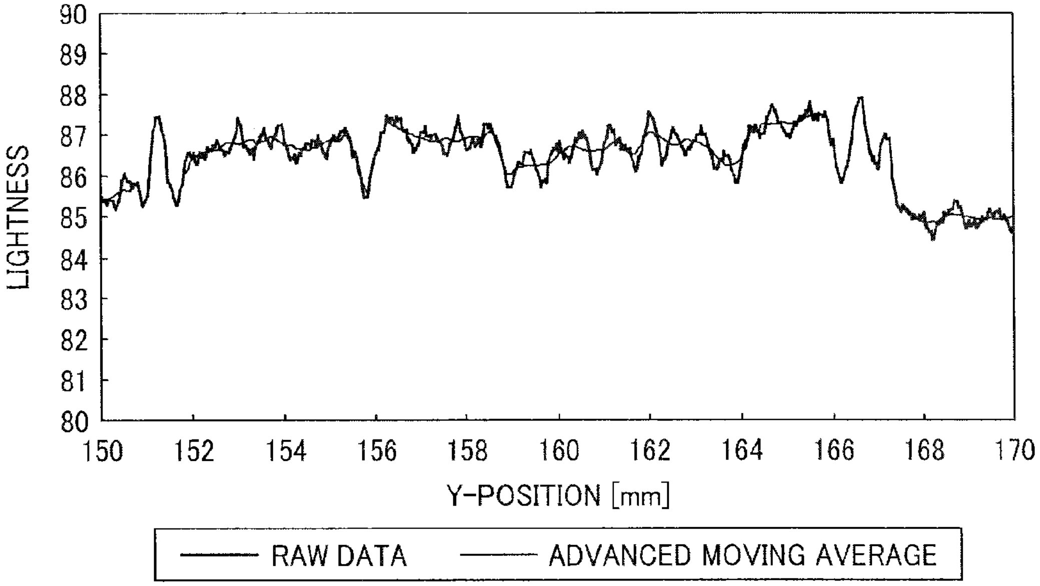
FIG. 10B is a graph illustrating the raw data curve of lightness and an advanced moving average curve of lightness in the range of from 150 mm to 170 mm in the Y direction.

In FIGS. 8B, 9B and 10B, actual measurement values of lightness are illustrated by a broad line and the values obtained by subjecting the actual measurement values to advanced moving averaging are illustrated by a narrow line. In the graphs illustrated in FIGS. 8B, 9B and 10B, actual measurement values of lightness of the solid image 100 obtained by the scanner 2085 are plotted on the vertical axis, and the Y-positions of the pixel rows are plotted on the horizontal axis.

The advanced moving averaging is the same as the simple moving averaging except that the number of lightness information data used for obtaining the advanced moving average varies depending on the variation (Δ) of the plural pieces of lightness information in the attention area.

Namely, in the advanced moving averaging, the number of lightness information data used for obtaining the moving average of the plural pieces of lightness information is set to a smaller number when the variation (Δ) of the plural pieces of lightness information in an attention area becomes larger, and the number of lightness information data used for obtaining the moving average of the plural pieces of lightness information is set to a larger number when the variation (Δ) of the plural pieces of lightness information in an attention area becomes smaller.

The number d(Δ) of lightness information data used for obtaining the advanced moving average is represented by the following equation (2).

$$d(\Delta) = HA\left[b\left\{-\left(\frac{\Delta}{a}\right)^c + 1\right\}\right] \tag{2}$$

In equation (2), Δ represents the variation width of lightness information, and each of a, b and c is a constant.

In equation (2), if d(Δ) is less than 0, the d(Δ) is considered as 0. In addition, HA[ ] represents round-off. In FIGS. 8B, 9B and 10B, a=2, b=10 and c=2. In equation (2), when Δ is 0, d(Δ) is b, and when Δ is a, d(Δ) is 0.

Figure 11:
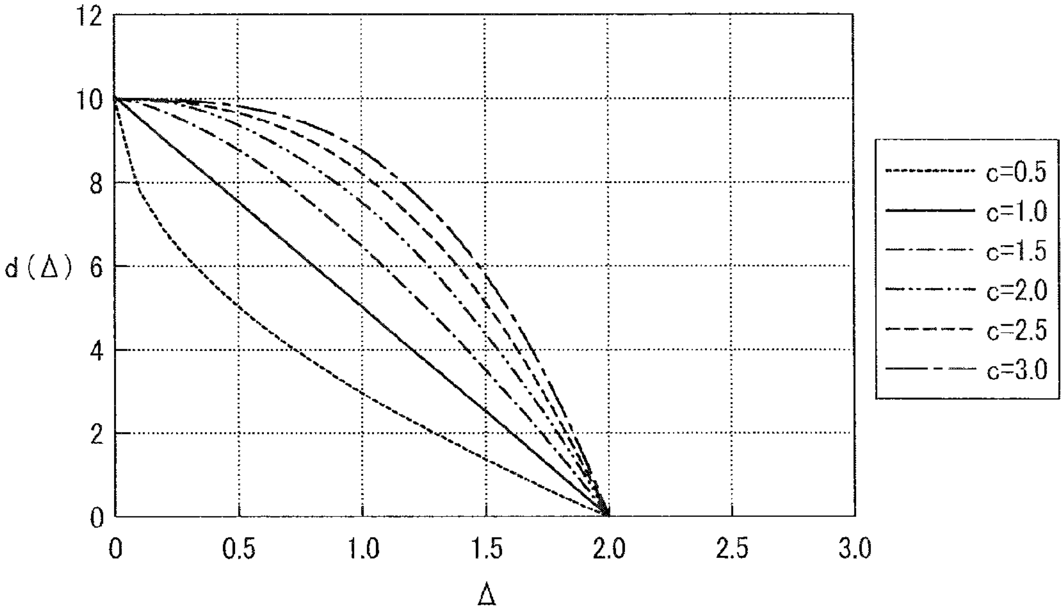
FIG. 11 is a graph illustrating relation between variation width (Δ) of lightness and the number d(Δ) of pieces of lightness information used for averaging.

FIG. 11 illustrates an example of the relation between the variation (Δ) and the number d(Δ).

The graph illustrated in FIG. 11 is illustrated without performing round-off (HA[ ]) on d(Δ) in equation (2) so that the relation can be easily understood. In FIG. 11, six curves are illustrated when c is 0.5, 1, 1.5, 2, 2.5 and 3 in equation (2). In the graphs in FIG. 11, a is 2 and b is 10. When c=1, the ratio of the change rate of d(Δ) to the change of Δ (i.e., differentiation of the graph in FIG. 11) is constant.

When the simple moving averages illustrated in FIGS. 8A, 9A and 10A are compared with the advanced moving averages illustrated in FIGS. 8B, 9B and 10B, it can be understood that both the high-frequency variations and the low-frequency variations are averaged in simple moving averaging, but only the high-frequency variations are averaged in advanced moving averaging without averaging the low-frequency variation.

Therefore, in this embodiment, the advanced moving averaging is used so that variation of lightness with high frequency, which has a small variation (Δ) is averaged, and variation of lightness with low frequency, which has a large variation (Δ), is not averaged as much as possible.

Referring back to FIG. 5, in step S9, 1 is set to k.

In step S11, it is judged whether the number of lightness information data used for averaging in the k-th attention area among the K attention areas is 2 or more.

If the number of lightness information data is 2 or more, the operation of step S13 is performed. In step S13, 1 is set to n.

In step S15, the average value of the d(Δ) pieces of lightness information data in the k-th attention area, which include n-th lightness information data, is obtained. Namely, each of the N pieces of lightness information data of the k-th attention area are subjected to moving averaging, wherein the number of lightness information data used for averaging is d(Δ).

Specifically, when the number d(Δ) of lightness information data used for averaging is 2r+1 (r is a positive integer), i.e., an odd number, for example, the following averaging is performed. Specifically, the average of (2r+1) pieces of lightness information data, i.e., the lightness information data of the n-th pixel row, the lightness information data of (r+i) (i is an integer whose absolute value is not greater than r) pieces of pixel rows adjacent to the n-th pixel row in the +Y direction, and the lightness information data of (r−i) pieces of pixel rows adjacent to the n-th pixel row in the −Y direction, is obtained.

In contrast, when the number d(Δ) of lightness information data used for averaging is 2r, i.e., an even number, for example, the following averaging is performed. Specifically, the average of (2r) pieces of lightness information data, i.e., the lightness information data of the n-th pixel row, the lightness information data of (r+i) (i is an integer whose absolute value is not greater than r−1) pieces of pixel rows adjacent to the n-th pixel row in the +Y direction, and the lightness information data of (r−i−1) pieces of pixel rows adjacent to the n-th pixel row in the −Y direction, is obtained.

In next step S17, the n-th lightness information of the k-th attention area is replaced with the thus obtained average value.

The operations of from step S5 to step S17 will be described by reference to a specific example. When a=2, b=10, and c=2 in equation (2); the number (N) of lightness information data of the k-th attention area is 21; and the variation (Δ) of the 21 lightness information data is 1, the number d(Δ) of lightness information data used for averaging is determined as 8 from equation (2) and FIG. 11. In this case, the average of 8 pieces of lightness information data, i.e., the lightness information data of the n-th pixel row, the lightness information data of four (or three) pieces of pixel rows adjacent to the n-th pixel row in the +Y direction, and the lightness information data of three (or four) pieces of pixel rows adjacent to the n-th pixel row in the −Y direction, is obtained. Next, the n-th lightness information of the k-th attention is replaced with the thus obtained average value.

In step S19, it is judged whether or not n is N. When n is not N, step S21 is executed. In step S21, n is incremented, and the operation returns to step S15.

When n is N in step S19 or the judgment in step S11 is NO, step S23 is executed. In step S23, it is judged whether or not k is K.

When k is not K, step S25 is executed. In step S25, k is incremented, and the operation returns to step S11.

When k is K in step S23, step S27 is executed. In step S27, the light quantity correction data used for correcting the quantity of light emitted from the multiple LEDs are generated based on the thus determined N average values or the N pieces of lightness information data (illustrated in FIGS. 8B, 9B and 10B), and the light quantity correction data are stored.

A specific example of the light quantity correction data generation method is that the relation between change of lightness and change of light quantity is preliminarily obtained, and light quantity correction data are generated based on the relation to reduce the change of the lightness of the solid image 100 in the Y-axis direction. The light quantity correction data are stored in the flash memory 3211. In this regard, it is preferable that by using the light quantity correction data, the lightness information data of all the pixel rows of the solid image 100 become equal to the average of all the lightness information data.

More specifically, the quantities of light emitted from the multiple LEDs of the printhead 2200 are corrected so that the variation of lightness of the solid image 100 in the Y-axis direction is reduced, and the light quantity correction data are stored. Namely, the light quantity correction data include light quantity correction data for each LED. In this regard, correction of the light quantity of a LED is performed by adjusting the current supplied to the LED (i.e., increasing or decreasing the current so as to be higher or lower than a reference current).

When a print request is made from the host apparatus to the color printer 2000, the light quantity adjusting circuit 3223 sends the light quantity correction data to the light source driving circuit 3221. The light source driving circuit 3221 corrects the driving signals for the LEDs, which are modulated according to the image information sent form the write controlling circuit 3219, based on the light quantity correction data, and outputs the corrected driving signals to the LEDs.

As mentioned above, the light quantity correction data of one of the printheads are prepared and stored. Similarly, the light quantity correction data of the other printheads are also prepared and stored. Thus, the light quantities of light emitted from the printheads 2200 are adjusted before printing based on the light quantity correction data.

Therefore, high quality color images can be formed on a recording medium.

The above-mentioned light quantity correction data generation/storage operation is performed by an operator, a serviceman, or a user via an operating portion (such as operation panel). Alternatively, the operation may be automatically performed periodically or when the environmental conditions such as temperature and humidity change or a predetermined number of prints are formed.

As mentioned above, the light quantity adjusting method according to an embodiment includes:

obtaining plural pieces of lightness information concerning plural pixel rows (located at plural positions in the Y-axis direction) of the solid image 100, which is formed on the recording medium W via the corresponding photoreceptor drum 2030 using the printhead 2000 having plural LEDs arranged in the Y-axis direction;

calculating variation width (Δ) (i.e., a reference value) based on N pieces of lightness information concerning an attention area having a width D in the Y-axis direction among the plural pieces of lightness information;

determining the number d(Δ) of piece of lightness information, which is used for obtaining a moving average value of each of the N pieces of lightness information, based on the variation width (Δ);

when the number d(Δ) of pieces of lightness information is two or more, obtaining moving average of each of the N pieces of lightness information using the number d(Δ); and correcting the quantities of light emitted from N pieces of LEDs corresponding to the N pieces of lightness information based on the moving average values.

In this method, since the number d(Δ) of piece of lightness information used for obtaining a moving average value of each of the N pieces of lightness information is determined based on the variation width (Δ) the degree of averaging of the N pieces of lightness information can be changed depending on the variation width (Δ)

Specifically, as the variation width (Δ) becomes larger, the degree of averaging of the N pieces of lightness information becomes lower. In other words, as the variation width (Δ) becomes smaller, the degree of averaging of the N pieces of lightness information becomes higher.

In addition, in the correcting step mentioned above, the quantities of light emitted from N pieces of LEDs corresponding to the N pieces of lightness information are corrected based on the moving average values when the number d(Δ) is 2 or more.

In this case, high frequency components including measurement errors can be precisely removed from the variation of lightness of the solid image 100 in the Y-axis direction, and therefore light quantity correction data can be precisely prepared based on the precise variation of lightness. Namely, highly-reliable light quantity correction data can be prepared, thereby making it possible to prevent formation of an uneven density image (stripe image) caused by the high frequency components including measurement errors.

As a result, the quality of the output images can be enhanced.

Further, in the correcting step, when the number d(Δ) of lightness information data used for obtaining the moving average value of each of the N pieces of lightness information is 0 or 1, the quantities of light emitted from N pieces of LEDs corresponding to the N pieces of lightness information of the attention area are corrected based on the N pieces of lightness information.

In this case, low frequency components including no measurement errors remain in the variation of lightness of the solid image 100 in the Y-axis direction, and the quantities of light emitted from N pieces of LEDs corresponding to the N pieces of lightness information of the attention area are corrected based on the variation of lightness. Namely, highly-reliable light quantity correction data can be prepared, thereby making it possible to prevent formation of an uneven density image (stripe image) caused by the low frequency components including no measurement errors.

As a result, the quality of the output images can be further enhanced.

In addition, the reference value determined based on the N pieces of lightness information of the attention area is the difference (i.e., variation width (Δ)) between the maximum lightness information and the minimum lightness information among plural pieces of information. Therefore, the reference value can be easily calculated rapidly.

Further, the width (D) of the attention area in the Y-axis direction is, for example, not less than 0.1 mm and not greater than 2 mm.

In this case, variation including high frequency components having small variation width (Δ) is averaged relatively easily while variation including low frequency components having large variation width (Δ) is hardly averaged. Therefore, formation of vertical stripe images at a distance of 1 mm, which can be easily observed visually, in an output image can be prevented.

Since the quantity of light emitted from each of the printheads 2200 of the color printer 2000 is adjusted by the light quantity adjusting method according to an embodiment, high quality color images without vertical stripe images can be produced.

When the color printer 2000 is produced, the light quantity adjusting method according to an embodiment can be used. Specifically, when the color printer 2000, which uses plural printheads, is produced, the operations of from step S1 to step S27 are performed on each printhead to adjust the quantities of light emitted from the printheads. In this case, formation of an uneven density image (vertical stripe image) can be prevented, and therefore the quality of output images can be enhanced. As a result, a color printer capable of producing high quality images can be produced.

It is preferable that as illustrated in the graph of FIG. 11 including 6 curves, the number d(Δ) of lightness information data used for obtaining the moving average value is set to a smaller number as the variation width (Δ) increases. In this case, variation including high frequency components tends to be averaged, and variation including low frequency components tends to be averaged hardly.

It is more preferable that as illustrated in the four curves in FIG. 11 in which c is greater than 1, the number d(Δ) of lightness information data used for obtaining the moving average value is determined such that as the variation width (Δ) increases, the absolute value of rate of change of the number d(Δ) against the variation width (Δ) increases. In this case, variation including high frequency components tends to be averaged more easily, and variation including low frequency components tends to be averaged more hardly.

It is more preferable that as illustrated in the four curves in FIG. 11 in which c is greater than 1, the number d(Δ) of lightness information data used for obtaining the moving average value is determined such that the rate of change of the number d(Δ) against the variation width (Δ) (i.e., differentiation of the curves) decreases monotonically as the variation width (Δ) increases. In this case, variation including high frequency components tends to be averaged more easily, and variation including low frequency components tends to be averaged more hardly.

In this regard, in order that variation including high frequency components can be averaged easily, and variation including low frequency components can be averaged hardly, it is not preferable that the width (D) of the attention area is too wide or too narrow. When the width (D) of the attention area is too wide or too narrow, a problem such that variation including high frequency components is averaged hardly or variation including low frequency components is averaged easily tends to be caused even when the constants a, b and c are set to proper values depending on the width (D).

In order to prevent occurrence of such a problem, it is preferable that the width (D) is not less than 0.1 mm and not greater than 2 mm. In this case, variation including high frequency components tends to be averaged more easily, and variation including low frequency components tends to be averaged more hardly.

In the above-mentioned embodiment, the quantity of light emitted from the printhead 2200 is adjusted based on the plural pieces of information of lightness of the solid image 100 formed on the recording medium W via the photoreceptor drum 2030. However, the present invention is not limited thereto. For example, the quantity of light (plural light beams) emitted from the printhead 2200 may be adjusted based on plural pieces of information on a property of the plural light beams. In this case, as illustrated in the flowchart illustrated in FIG. 12, information on the property of the plural light beams emitted from the printhead 2200 is obtained (step S31), and then steps S33 to S57, which correspond to steps S3 to S27 in FIG. 5, are executed. As a result, formation of an uneven density image in an output image due to deficiency of the printhead can be prevented, and therefore the quality of output images can be enhanced. In this regard, the plural pieces of information concern the property of the plural light beams.

Figure 12:
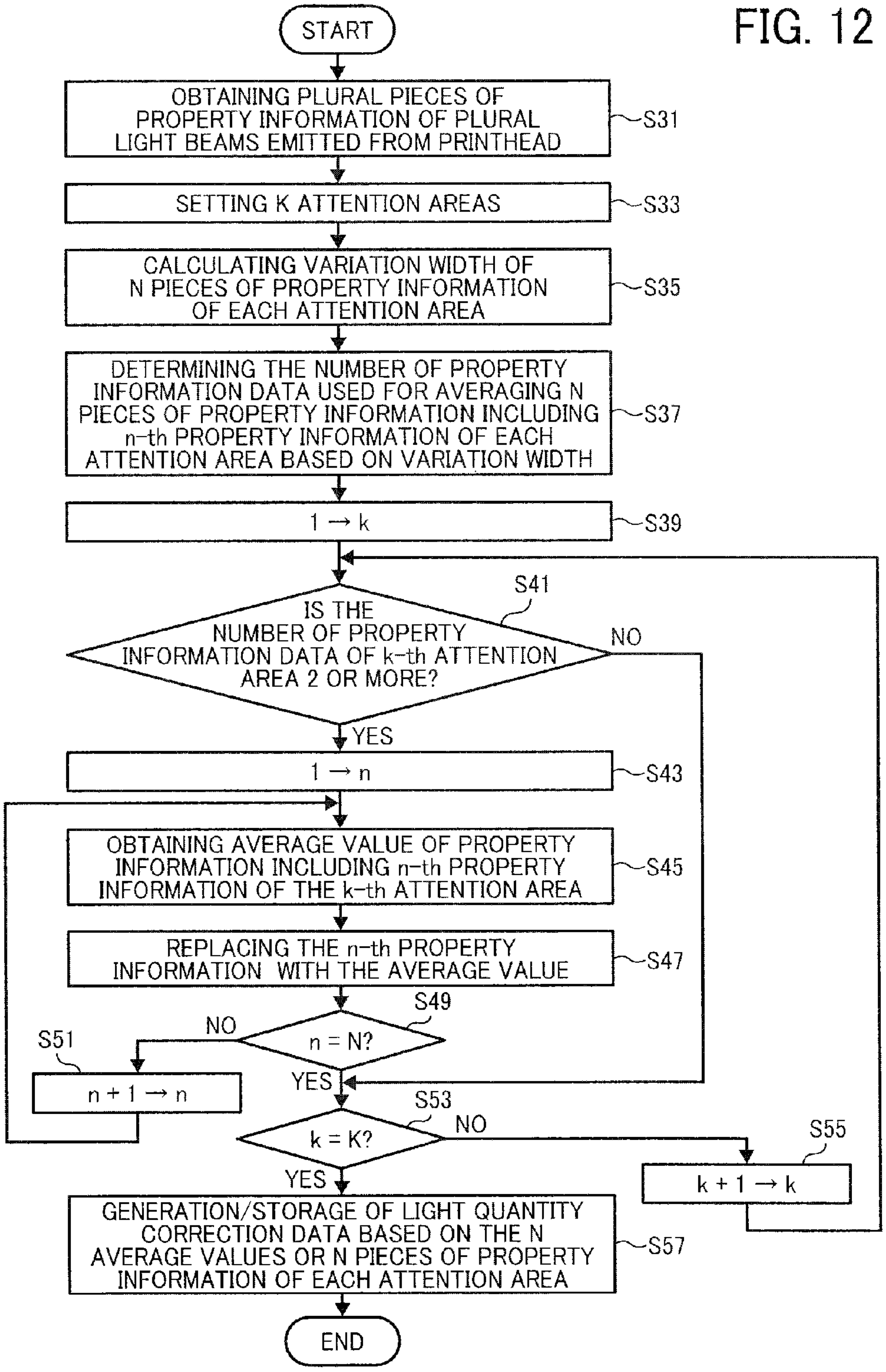
FIG. 12 is a flowchart illustrating another example of the operation of adjusting the quantity of light emitted from the printhead.

Specifically, in first step S31 of the flowchart illustrated in FIG. 12, all the LEDs of the printhead 2200 are lighted, and plural pieces of information on a property of plural light beams emitted by the LEDs of the printhead via the rod lenses RL are obtained using a printhead property measuring instrument (not shown).

Specific examples of the property of plural light beams emitted from the printhead 2200 include light quantity of light spots formed at focusing points by the light beams, and size of light spots formed at focusing points. Each of the properties changes like a curve illustrated in FIG. 7(*a*).

Steps S33 to S55 are executed similarly to steps S3 to S25 illustrated in FIG. 5.

In step S57 in FIG. 12, the light quantities of the light beams emitted from the plural LEDs are corrected based on the N average values or N pieces of information on the property concerning an attention area so that at least one of variation in light quantity of light spots and variation in size of light spots is reduced. Light quantity correction data including the correction data are stored in the flash memory 3211. In this regard, the quantity of light emitted from plural LEDs may be corrected such that at least one of the light quantity of light spots and the size of light spots is the same for all the light spots (for example, the same as the average of the property of all the light spots).

Steps S31 to S57 may be performed in a process of producing an image forming apparatus (a color printer 2000). In this case, formation of an uneven density image (vertical stripe image) due to deficiency of printheads can be prevented, and thereby the quality of output images can be enhanced, resulting in production of an image forming apparatus capable of producing high quality images.

In the above embodiment, the variation width (Δ) is used as the reference value calculated based on N pieces of lightness information concerning the attention area, or the N pieces of lightness information and Y positions of the N pieces of pixel rows corresponding to the N pieces of lightness information, but the reference value is not limited thereto For example, a method in which the difference in lightness between two pixels rows present at both ends of the attention area is calculated, the difference is divided by the distance between the two pixel rows in the Y-axis direction to obtain the ratio (i.e., slope L), and the absolute value of the slope L is used as the reference value can also be used. In this case, the number of lightness information data used for obtaining the moving average value is determined based on the absolute value of the slope L.

In addition, the number of lightness information data used for obtaining the moving average value may be determined based on the slope of at least one line obtained by subjecting plural pieces of information among N pieces of lightness information to linear approximation or a value based on the slope of the at least one line.

Specifically, in the method, an attention area having plural pieces of lightness information is divided into J (J≥2) areas in the Y direction, and the plural pieces of lightness information in each area are subjected to linear approximation to obtain slopes of J lines. In this case, values based on the J slopes are used as the reference value, namely the number of lightness information data used for obtaining the moving average value is determined based on the J slopes. For example, the maximum value of the absolute values of the slopes of the J lines or the average of the absolute values of the slopes of the J lines may be used as the reference value.

Further, a method in which the slope of a line obtained by subjecting the N pieces of lightness information concerning an attention area to linear approximation is used as the reference value can be used.

Even in the above-mentioned cases, it is preferable that the number of lightness information data used for obtaining the moving average value becomes smaller as the reference value becomes larger. It is more preferable that the number of lightness information data used for obtaining the moving average value is determined such that as the reference value becomes larger, the ratio of the absolute value of change rate of the number to the change of the reference value becomes larger. In addition, it is more preferable that the number of lightness information data used for obtaining the moving average value is determined such that as the reference value increases, the change rate of the number of lightness information data used for obtaining the moving average value to the change of the reference value decreases monotonically.

In addition, the equation used for calculating the number of lightness information data used for obtaining the moving average value is described by reference to equation (2), but another equation can also be used as long as the number of lightness information data used for obtaining the moving average value can be calculated by the equation based on the reference value determined based on the plural pieces of lightness information concerning each attention area.

In the above-mentioned embodiment of the light quantity adjusting method, correction of high-frequency lightness change is not performed. Therefore, when an image is formed on the recording medium W using the light quantity adjusting method and the lightness distribution of the image is measured, change of lightness (i.e., PV (Peak to Valley, i.e., Max-Min) of not greater than about 1), which has a width of about 1 mm in the Y-axis direction, remains as illustrated in FIGS. 8B, 9B and 10B. Namely, this means that in preparing the light quantity correction data in the above-mentioned embodiment, such change of lightness is intentionally left.

Figure 13:
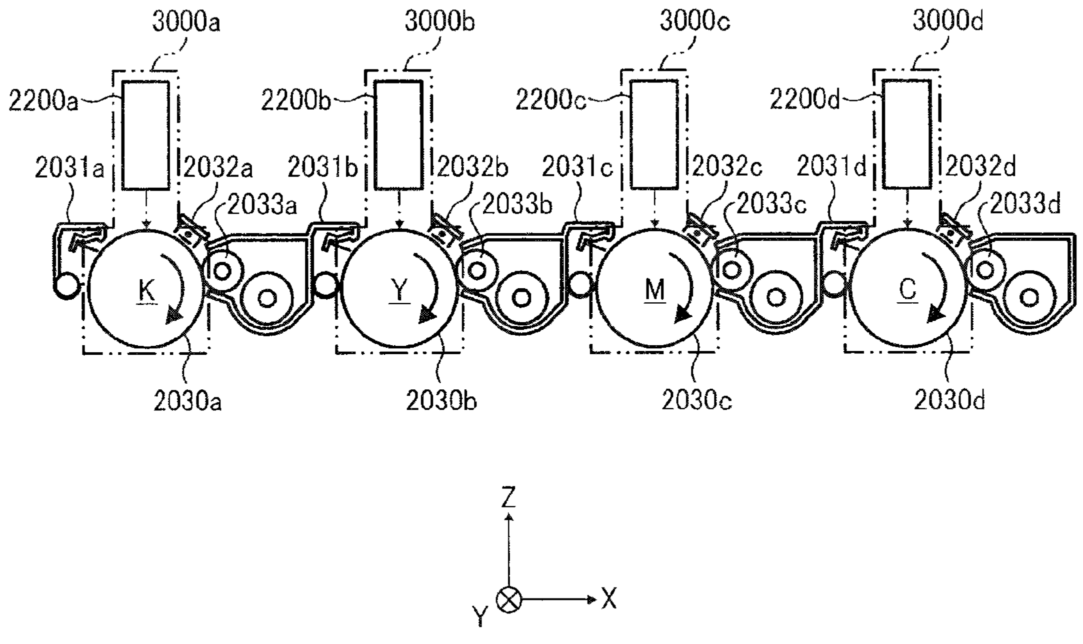
FIG. 13 is a schematic view of a process cartridge for use in describing a method for producing a process cartridge according to an embodiment.

A process cartridge 3000 (3000*a* to 3000*d*), which is illustrated in FIG. 13 and in which the printhead 2200 and the photoreceptor drum 2030 are integrated in such a manner as to be detachably attachable to a main body of an image forming apparatus such as the color printer illustrated in FIG. 1, can be used for the image forming apparatus. By using such a process cartridge, maintenance operations such as replacement and repair of the printheads and the photoreceptor drums can be easily performed. For example, when a photoreceptor drum is to be replaced, the process cartridge including the photoreceptor drum is replaced. Therefore the replacing operation can be easily performed.

Specifically, the light quantity adjusting method according to an embodiment can be applied to production of such process cartridges 3000. More specifically, when producing a process cartridge, the operations of steps S1 to S27 illustrated in FIG. 5 or steps S31 to S57 are performed to adjust the quantity of light emitted from the printhead of the process cartridge. In this case, qualities of output images can be enhanced, and a process cartridge capable of producing high quality images can be produced. The light quantity adjusting operation is performed on the process cartridge, for example, after setting the process cartridge to an image forming apparatus.

In the above-mentioned embodiment, the image formed on the recording medium W is a solid image, but the image is not limited thereto. For example, a line image extending in the Y-axis direction can also be used.

The shape, size, number, arrangement and tone of the solid image are not limited to those mentioned above, and can be changed properly. For example, an image including plural solid images can also be used.

In the above-mentioned embodiment, the plural LEDs are arranged in a line in the Y-axis direction. However, the arrangement of the LEDs is not limited thereto. For example, LEDs are arranged two-dimensionally so that the positions of the LEDs are different from each other in the Y-axis direction. Namely, the arrangement of LEDs is not limited as long as the positions of the LEDs are different from each other in the Y-axis direction.

In the above-mentioned embodiment, the scanner 2085 is provided in the color printer 2000 to read the solid image 100. However, such a scanner is not necessarily provided on the printer. For example, in a production process of the color printer, the solid image 100 may be read by a scanner set at a location in the factory, in which the color printer is produced. Alternatively, a scanner may be connected with the color printer to read the solid image 100 when the light quantity adjusting operation is performed on the color printer in a maintenance work.

In the above-mentioned embodiment, both the resolution of the printhead 2200 and the resolution of the scanner 2085 to read the solid image are 600 dpi, but the resolutions are not limited thereto and can be set to other values.

In the above-mentioned embodiment, the controller 3022 includes the light quantity adjusting circuit 3223. However, the controller does not necessarily include the light quantity adjusting circuit. In this case, the processing performed by the light quantity adjusting circuit 3223 is performed, for example, by the CPU 3210.

At least part of the processing performed by the controller 3022 in the above-mentioned embodiment may be performed by the printer controller 2090. In addition, at least part of processing performed by the printer controller 2090 in the above-mentioned embodiment may be performed by the controller 3022.

In the above-mentioned embodiment, LED is used for the light emitting portion, but light sources such as organic electroluminescence (EL), laser or the like can be used instead of LED.

In the above-mentioned embodiment, the color printer 2000 is used as an image forming apparatus. However, the image forming apparatus is not limited thereto, and may be a monochromatic printer, a copier, or a multifunctional product having a copying function and other functions such as functions of a facsimile and a printer. In a case of a copier having a scanner to read an image of an original, the scanner may be used for reading the solid image 100. In this case, it is not necessary to provide an scanner for exclusive use (such as the scanner 2085).

As mentioned above, according to the present invention, qualities of output images can be enhanced.

Additional modifications and variations of the present invention are possible in light of the above teachings. It is therefore to be understood that within the scope of the appended claims the invention may be practiced other than as specifically described herein.

What is claimed is:

1. A method for producing an image forming apparatus, which includes a printhead having multiple light emitting portions, which are arranged at different positions in a uniaxial direction to emit multiple light beams separated from each other in the uniaxial direction; and an image bearing member located on a light path of the multiple light beams, comprising:

emitting multiple light beams separated from each other in the uniaxial direction from the multiple light emitting portions;

irradiating the image bearing member with the multiple light beams to form an electrostatic latent image on a surface of the image bearing member;

forming a visible image on a recording medium based on the electrostatic latent image, wherein the visible image extends in the uniaxial direction;

obtaining one of plural pieces of information concerning a property of the multiple light beams at different positions of the visible image in the uniaxial direction, and plural pieces of information concerning lightness of the visible image at different positions of the visible image in the uniaxial direction;

calculating a reference value based on either two or more pieces of information among the plural pieces of information at two or more different positions in a predetermined range, which has a predetermined length in the uniaxial direction, or a combination of the two or more pieces of information and information on the two or more different positions;

determining a number of pieces of information, which is used for subjecting each of the two or more pieces of information to moving averaging, based on the reference value;

when the number of pieces of information is two or more, subjecting each of the two or more pieces of information to moving averaging using the number; and correcting quantities of light beams emitted from two or more light emitting portions of the multiple light emitting portions, which correspond to the two or more different positions in the uniaxial direction, based on the average values obtained by the moving averaging.

2. The method according to claim 1, wherein the correcting step includes:

when the number is 0 or 1, correcting quantities of light beams emitted from the two or more light emitting portions based on the two or more pieces of information.

3. The method according to claim 1, wherein the predetermined length of the predetermined range is not less than 0.1 mm and not greater than 2 mm.

4. The method according to claim 1, wherein the reference value is a difference between a maximum value and a minimum value of the two or more pieces of information.

5. The method according to claim 1, wherein the reference value calculating step includes:

subjecting plural pieces of information among the two or more pieces of information to linear approximation to obtain at least one line; and determining the reference value based on a slope of the at least one line or a value based on the slope.

6. The method according to claim 1, wherein the reference value calculating step includes:

calculating a ratio of a difference between two pieces of information at both ends of the predetermined range to a distance between the ends in the uniaxial direction; and determining the reference value based on the ratio.

7. The method according to claim 1, wherein the number determining step includes:

determining a number of piece of information, which is used for subjecting each of the two or more pieces of information to moving averaging, based on the reference value in such a manner that as the reference value becomes larger, the number pieces of information becomes smaller.

8. The method according to claim 7, wherein the number determining step includes:

determining a number of piece of information, which is used for subjecting each of the two or more pieces of information to moving averaging, based on the reference value in such a manner that as the reference value becomes larger, an absolute value of a ratio of change of the number of piece of information to change of the reference value becomes larger.

9. The method according to claim 7, wherein the number determining step includes:

determining a number of piece of information, which is used for subjecting each of the two or more pieces of information to moving averaging, based on the reference value in such a manner that as the reference value increases, a ratio of change of the number of pieces of information to change of the reference value changes monotonically decreases.

10. The method according to claim 1, wherein the property of the multiple light beams in the information obtaining step is light quantity of light spots formed by the multiple light beams at focusing points, or size of light spots formed by the multiple light beams at focusing points.

11. A method for adjusting quantities of light beams emitted from multiple light emitting portions of a printhead, which are arranged at different positions in a uniaxial direction, comprising:

emitting multiple light beams separated from each other in the uniaxial direction from the multiple light emitting portions;

irradiating an image bearing member with the multiple light beams to form an electrostatic latent image on a surface of the image bearing member;

forming a visible image on a recording medium based on the electrostatic latent image, wherein the visible image extends in the uniaxial direction;

obtaining one of plural pieces of information concerning a property of the multiple light beams at different positions of the visible image in the uniaxial direction, and plural pieces of information concerning lightness of the visible image at different positions of the visible image in the uniaxial direction;

calculating a reference value based on either two or more pieces of information among the plural pieces of information at two or more different positions in a predetermined range, which has a predetermined length in the uniaxial direction, or a combination of the two or more pieces of information and information on the two or more different positions;

determining a number of pieces of information, which is used for subjecting each of the two or more pieces of information to moving averaging, based on the reference value;

when the number of pieces of information is two or more, subjecting each of the two or more pieces of information to moving averaging using the number; and correcting quantities of light beams emitted from two or more light emitting portions of the multiple light emitting portions, which correspond to the two or more different positions in the uniaxial direction, based on the average values obtained by the moving averaging.

12. A method for producing a process cartridge, which includes a printhead having multiple light emitting portions, which are arranged at different positions in a uniaxial direction to emit multiple light beams separated from each other in the uniaxial direction; and an image bearing member located on a light path of the multiple light beams emitted by the multiple light emitting portions, wherein the printhead and the image bearing member are integrated so as to be detachably attachable to an image forming apparatus as a single unit:

emitting multiple light beams separated from each other in the uniaxial direction from the multiple light emitting portions;

irradiating the image bearing member with the multiple light beams to form an electrostatic latent image on a surface of the image bearing member;

forming a visible image on a recording medium based on the electrostatic latent image, wherein the visible image extends in the uniaxial direction;

obtaining one of plural pieces of information concerning a property of the multiple light beams at different positions of the visible image in the uniaxial direction, and plural pieces of information concerning lightness of the visible image at different positions of the visible image in the uniaxial direction;

calculating a reference value based on either two or more pieces of information among the plural pieces of information at two or more different positions in a predetermined range, which has a predetermined length in the uniaxial direction, or a combination of the two or more pieces of information and information on the two or more different positions;

determining a number of pieces of information, which is used for subjecting each of the two or more pieces of information to moving averaging, based on the reference value;

when the number of pieces of information is two or more, subjecting each of the two or more pieces of information to moving averaging using the number; and correcting quantities of light beams emitted from two or more light emitting portions of the multiple light emitting portions, which correspond to the two or more different positions in the uniaxial direction, based on the average values obtained by the moving averaging.

* * * * *